United States Patent
Fell et al.

[11] 3,736,733
[45] June 5, 1973

[54] THREE-ROW CROP HEADER FOR FORAGE HARVESTERS

[75] Inventors: Ferol S. Fell, Newton; William D. Long, Hesston; Kenneth R. McMillen, Moundridge, all of Kans.

[73] Assignee: Hesston Corporation, Hesston, Kans.

[22] Filed: Nov. 4, 1970

[21] Appl. No.: 86,767

[52] U.S. Cl. .................................................56/98
[51] Int. Cl. .............................................A01d 45/02
[58] Field of Search .........................56/98, 106, 108, 56/111, 112, 119

[56] References Cited

UNITED STATES PATENTS

| | | | |
|---|---|---|---|
| 2,139,962 | 12/1938 | Knudson | 56/98 |
| 3,201,928 | 8/1965 | Claas | 56/98 |
| 3,585,789 | 6/1971 | Blanshine et al. | 56/98 |
| 3,365,867 | 1/1968 | Phillips | 56/119 X |
| 3,375,646 | 4/1968 | Dion | 56/98 |

*Primary Examiner*—Russell R. Kinsey
*Assistant Examiner*—J. A. Oliff
*Attorney*—Schmidt, Johnson, Hovey & Williams

[57] ABSTRACT

A row crop forage harvester has three, inclined pairs of pronged gathering chains on a header attachment for rearward conveyance of stalks that are severed by a transverse cutter at the lower front end of the header. The stalks are delivered rearwardly by the chains at their upper, rear ends butt first directly between a pair of transverse rolls that compress and feed the stalks into a transverse rotatable reel-type chopper cooperating with a shear bar. The severed butt ends of the stalks slide upwardly along ramps parallel to and disposed beneath the chains. All of the chains and their ramps terminate at their upper ends within substantially the same vertical plane immediately ahead of the rolls. At their discharge ends a pair of medial chains are driven by and overlap adjacent chains, the latter of which diverge toward the cutter.

2 Claims, 4 Drawing Figures

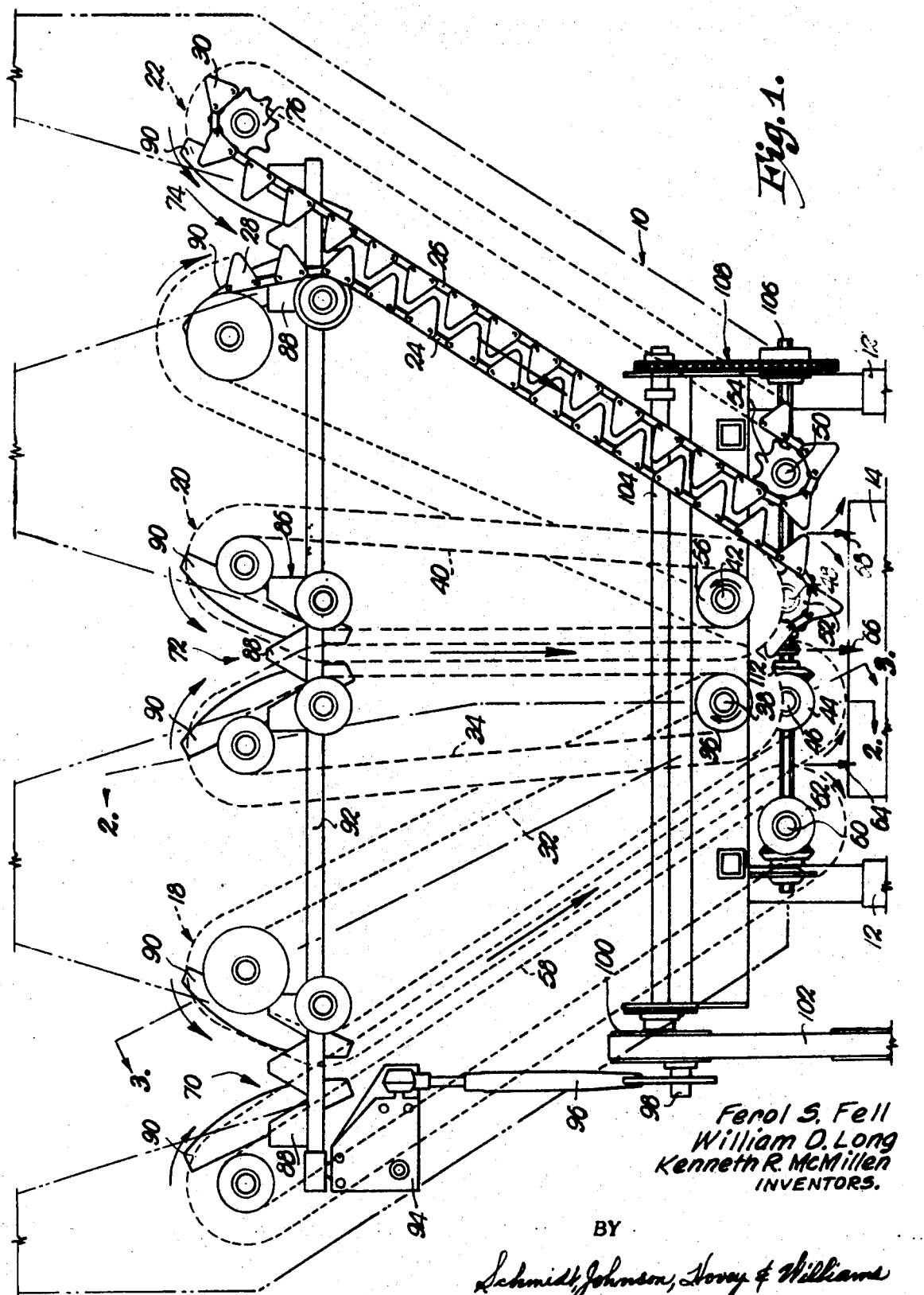

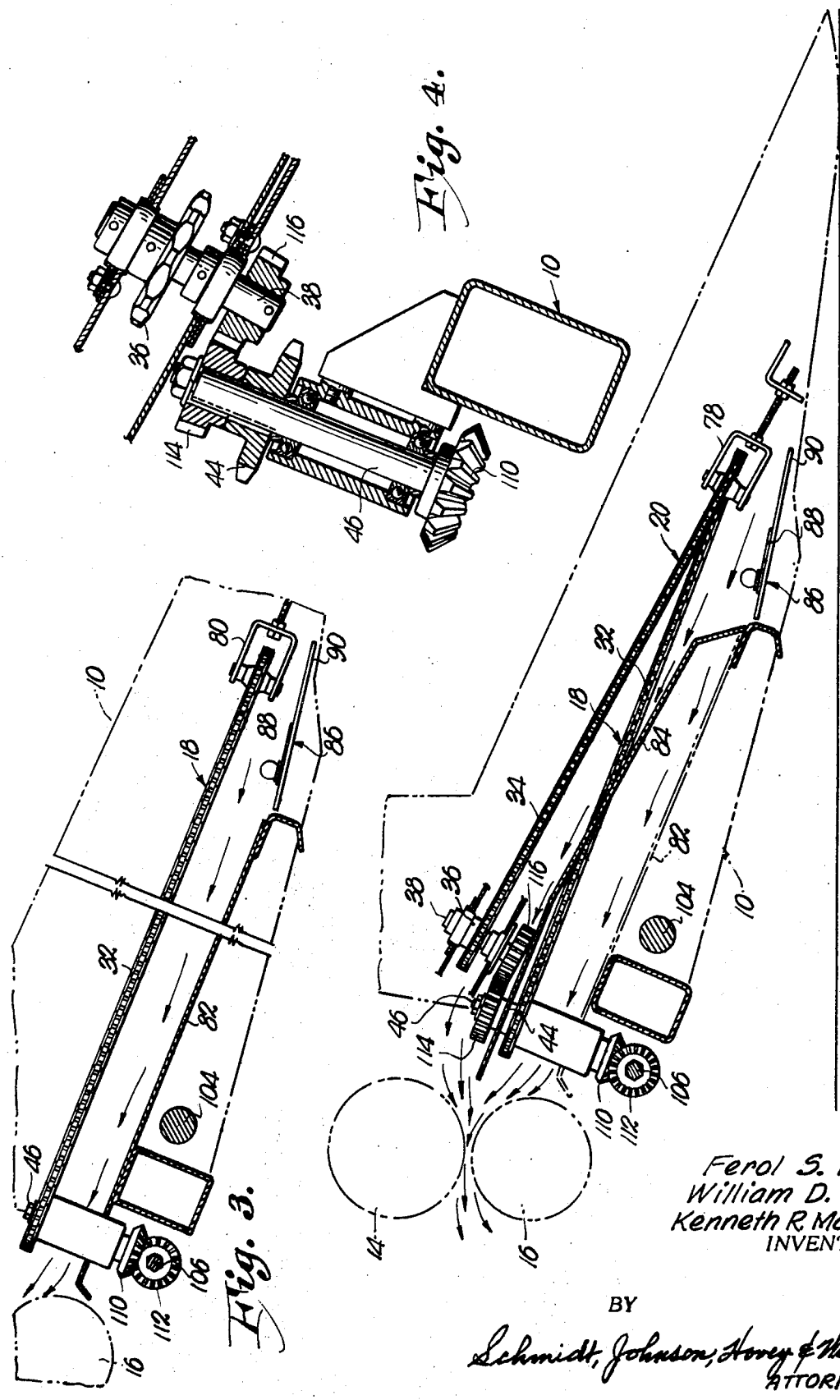

3,736,733

THREE-ROW CROP HEADER FOR FORAGE HARVESTERS

Efforts to develop three-row forage harvesters within desired space limitations have not been too successful. The provision of choppers and accompanying feeder rolls that are as long laterally as the combined width of three crop rows is, of course, impractical. The inlet ends of the gathering chains must be spaced in accordance with the distance between the rows and the outlet ends of the chains are, therefore, customarily pulled in to permit reduction in the length of the feeder rolls and the chopper. This has not heretofore permitted extension of the center chains all the way back to the feeder rolls with the result that direct delivery to the feeder rolls is provided only by the two outer sets of gathering chains. The outlet end of the center chains has been spaced forwardly of the feeder rolls and it has, therefore, been necessary to provide aprons and other secondary elements, such as additional conveyors, for transmission of the stalks from the outlet of the center chains on back to the feeder rolls. This indirect delivery from the center chains, being neither uniform nor positive, has created problems in that there is oftentimes a lag between cutting and pick up, the operator must slow the machine down from time to time to permit the feed rolls to catch up, and frequent, time consuming clogging, particularly at the center of the feed rolls, is indeed quite exasperating. Moreover, it is virtually impossible to provide a uniform length of cut entirely across the shear bar without a constant flow of the stalks from the header to the feeder rolls, and the overall capacity of the machine is substantially reduced.

It is the primary object of our present invention therefore to provide a high capacity row crop implement which will harvest better forage in a shorter period of time than has heretofore been possible.

The most important object of the instant invention is to provide a simple compact three-row forage harvester which delivers all of the stalks constantly and at the same rate directly to the feeder rolls.

Another important object of the present invention is the provision of a low cost yet rugged forage harvester which forcefully and uniformly directs the severed stalks of all three rows to the feeder rolls butt end first.

Still another important object of our present invention is the provision of a simple unique trouble-free drive, common to all three sets of gathering chains, and capable of being powered from a single source.

The manner of accomplishing the aforesaid and many other important objects of the present invention will be made clear or become apparent as the following specification progresses, reference being had to the accompanying drawings wherein:

FIG. 1 is a partially schematic, fragmentary top plan view of a three-row crop header for forage harvesters made in accordance with the present invention;

FIG. 2 is an enlarged vertical cross-sectional view taken generally on line 2—2 of FIG. 1 and including certain schematics in phantom for the purpose of depicting relationships of components;

FIG. 3 is a cross-sectional view similar to and on the same scale as FIG. 2 taken generally along line 3-3 of FIG. 1; and FIG. 4 is a fragmentary vertical cross-sectional view similar to a portion of FIG. 2 but still further enlarged taken through one of the drive connections between one of the medial gathering chains and an adjacent one of the outer gathering chains.

It is contemplated by the present invention that header 10 constitute a composite unit detachably mounted in any conventional manner in leading relationship to the implement for vertical swinging movement about a horizontal axis through use of a pair of spaced rearwardly extending brackets 12. To this end then the three-row header 10 becomes universally adaptable for use with either a pull-type forage harvester or a self-propelled type as may be desired.

By way of further initial explanation the header 10 extends forwardly and downwardly during normal use from the chopping assembly of the harvester (not shown), and more particularly, from the feeder rolls of the implement that are disposed ahead of the chopper, only two of such feeder rolls being illustrated and designated by the numerals 14 and 16. The chopper rotates about a horizontal axis in parallelism with the axes of rotation of the rolls 14 and 16, receives the crop from the feeder and cooperates with a shear bar to cut the stalks into small segments of predetermined length, all as is broadly illustrated in U.S. Pat. No. 2,651,162 dated September 8, 1953 and referred to herein by way of example only.

While one and two-row harvesters for severing, rearward conveyance through use of gathering chains, delivery to feeder rolls and chopping in the aforementioned manner have been in successful use for many years, attempts to adapt such principles to a three-row machine have not, for the aforementioned reasons, met with commercial success.

Accordingly, as illustrated, header 10 is provided with three stalk gathering mechanisms broadly designated by the numerals 18, 20 and 22, all designed and arranged to deliver the severed stalks of the three corresponding crop rows directly and butt end first to the feeder rolls 14 and 16. Each of the mechanisms 18, 20 and 22 includes a pair of co-operating pronged or lugged endless chains trained about upper and lower rotatable carriers. Such chains 24 and 26 for the mechanism 22 and corresponding prongs or lugs 28 and 30 are illustrated in FIG. 1 of the drawings whereas one of the chains 32 for the mechanism 18 is illustrated best in FIGS. 2 and 3 of the drawings. FIG. 2 also shows one of the chains 34 of the mechanism 20, it being understood therefore that the sets of two gathering chains and the lugs therefor are substantially the same in all three mechanisms 18, 20 and 22.

In FIG. 4 of the drawings there is illustrated a sprocket wheel 36 secured to an inclined shaft 38 constituting the rotatable uppermost carrier for one of the chains 34 of the medial mechanism 20, such chain 34 being trained around the sprocket wheel 36 in the usual manner. The other chain for the mechanism 20 is shown schematically in FIG. 1 and designated by the numeral 40 with its upper carrier shaft, corresponding to the shaft 38, designated by the numeral 42.

FIG. 4 also illustrates the sprocket wheel 44 for the chain 32 mounted on inclined shaft 46 and constituting the uppermost and rearmost rotatable carrier for the chain 32, the latter of which is trained at its uppermost end around the sprocket wheel 44.

Chains 24 and 26 are provided with shafts 48 and 50 corresponding to shaft 46 having sprocket wheels 52 and 54 corresponding to sprocket wheel 44. By the same token the shaft 42 of chain 40 has a sprocket wheel 56 corresponding to the sprocket wheel 36. Moreover, chain 58 forming a part of the mechanism 18 and disposed in opposed relationship to the chain 32 has a shaft 60 provided with a sprocket wheel 62 corresponding to shaft 46 and sprocket wheel 44 of the chain 32.

The uppermost and rearmost rearwardly facing stalk outlet ends of the mechanisms 18, 20 and 22 are designated by the arrows 64, 66 and 68 respectively in FIG. 1, whereas the lowermost and forwardmost forwardly facing mouths or inlet ends of the mechanisms 18, 20 and 22 are designated by the numerals 70, 72 and 74 respectively.

The lowermost and forwardmost ends of all six chains 24 and 26, 34 and 40, and 32 and 58 are trained around sprocket wheels such as designated at 76 in FIG. 1 for the chain 26 and each is carried by an adjustable bracket, one of which, for the chain 34, is designated by the numeral 78 in FIG. 2 and another of which adjustable bracket or yoke-like hanger for the chain 32 is designated by the numeral 80 in FIG. 3.

While all four chains 32 and 58 for the outer mechanism 18 and 24 and 26 for the outer mechanism 22 are on the same inclined plane sloping downwardly and forwardly toward the inlets 70 and 74 respectively, the chains 34 and 40 for the medial mechanism 20 are disposed at a steeper or greater angle as best seen in FIG. 2 to the end that the upper portion of the chains 34 and 40 partially overlap the proximal chains 32 and 24 respectively as shown in FIG. 1. Accordingly the mechanisms 18 and 22 are each provided with an underlying parallel ramp, one of which, for the chains 32 and 58, is illustrated in FIG. 3 and designated by the numeral 82. Similarly the chains 34 and 40 are provided with a ramp 84, shown in FIG. 2, which is likewise parallel thereto throughout a substantial portion of the length of the ramp 84. All of the ramps 82 and 84 extend rearwardly from immediately behind a cutter 86 toward the rolls 14 and 16, terminating in substantially the same vertical plane as the outlets 64, 66 and 68.

The cutter 86 is of the reciprocating sickle type having knives 88 for each mechanism 18, 20 and 22 cooperating with a pair of blades 90 in fixed relationship to each of the inlets 70, 72 and 74 respectively and converging as the knives 88 are approached.

The transversely reciprocable bar 92 upon which the knives 88 are mounted is provided with a bell crank sickle drive 94 operated by a connecting rod 96 from an eccentric 98 on a pulley 100 that is in turn driven by belt 102. Belt 102 is in turn driven from a gearbox (not shown) operably coupled either with the power take-off of a towing vehicle or directly from the crankshaft of the prime mover in the event that header 10 is used with a self-propelled harvester.

Pulley 100 is also connected to and therefore drives the transverse shaft 104 underlying the ramps 82 and 84 and connected with a second shaft 106 parallel to and disposed rearwardly of the shaft 104 by a chain and sprocket wheel assembly 108.

As best seen in FIG. 4, the shaft 46 has a bevel gear 110 at its lowermost and rearmost end overlying the shaft 106 and a similar gear is provided on each of the shafts 48, 50 and 60 respectively. A bevel gear 112 on shaft 106 meshes with the gear 110 as shown in FIGS. 2 and 3 and here again shaft 106 is provided with similar gears for each of the shafts 48, 50 and 60 respectively as seen in part by FIG. 1.

The power thus transmitted by the shaft 106 to operate all six chains in the direction of the arrows shown at the inlets 70, 72 and 74 of FIG. 1 rotates a pair of gears 114 and 116 (see FIG. 4) on shafts 46 and 48 respectively so as to drive the median chains 34 and 40 through sprocket wheels 36 and 56, gears comparable to gears 114 and 116 (not shown) being provided for the chain 40. Intermeshing gears 114 and 116 are specially chosen to accommodate the difference in inclination between shafts 36 and 46 and serve therefore to, in effect, drive the chains 34 and 40 from the chains 32 and 24 respectively.

In operation, the stalks entering the mouths 70, 72 and 74 are fed to the cutter 86 by the lugs 28 and 30 and severed by the knives 88 and blades 90, whereupon the mechanisms 18, 20 and 22 convey the stalks toward the feeder rolls 14 and 16 as the severed butt ends of the stalks slide upwardly and rearwardly along the ramps 82 and 84. While the stalks within the mechanism 20 move along a straight line between the chains 34 and 40, the stalks being conveyed by the mechanisms 18 and 22 are gradually pulled inwardly by virtue of the converging relationship of the two outer mechanisms 18 and 22.

Therefore by virtue of the overlapping of the chains 34 and 40 at their upper ends with respect to proximal chains 32 and 24 all of the stalks emerge from the outlets 64, 66 and 68 at approximately the same time and at the same place immediately ahead of the rolls 14 and 16 within relatively narrow lateral confines dictated by the lengths of the rolls 14 and 16 which need not be increased beyond normal notwithstanding the fact that the inlets 70, 72 and 74 are spread far apart in accordance with the spacings between the crop rows.

There is therefore no need for any secondary conveyance of the stalks from the mechanism 20 to the rolls 14 and 16 and direct feeding of the stalks to the rolls 14 and 16 is effected in like manner by all three assemblies 18, 20 and 22.

These highly advantageous results are made possible not only by virtue of the aforementioned overlapping arrangement but by virtue of the novel drive illustrated best in FIG. 4 for the medial mechanism 20 from the proximal chains 24 and 32.

Having thus described the invention, what is claimed as new and desired to be secured by Letters Patent is:

1. In a three-row forage harvester having a pair of rolls for feeding severed stalks to a stalk chopper behind the rolls, and a row crop header extending downwardly and forwardly of the rolls and having a stalk cutter at the forwardmost and lowermost end thereof, structure on said header for conveying the severed stalks from the cutter to the rolls, said structure including:

a single layer only of crop gathering mechanisms comprising three pairs of stalk gathering chains extending at an angle upwardly and rearwardly from the cutter to the rolls, each pair having a lowermost and forwardmost inlet end for receiving a row of stalks, and an uppermost and rear-most outlet end next adjacent the rolls for delivery of the stalks directly to the rolls, said inlet ends being horizontally spaced, being aligned transversely of the header, and being disposed in a common horizontal plane, said three pairs of stalk gathering chains comprising a medial pair of chains and two outer pairs of chains on each side of said medial pair of chains with the outer pairs of chains diverging as their inlet ends are approached, the outlet ends of the outer pairs of chains being horizontally spaced, being aligned transversely of the header, and being disposed in a common horizontal plane, the upward and rearward angularity of the medial pair of chains being greater than that of the outer pairs of chains, each chain of said medial pair of chains overlapping the proximal innermost of said outer pairs of chains.

2. In a forage harvester as claimed in claim 1, each of said chains having an uppermost carrier provided with a forwardly inclined, rotatable shaft; and means operably coupling the shaft of each chain of the medial pair thereof with a corresponding proximal shaft of the outer pairs of chains whereby the medial pair of chains are driven upon driving of the outer pairs of chains.

* * * * *